United States Patent
Noldus et al.

(10) Patent No.: US 9,584,559 B2
(45) Date of Patent: Feb. 28, 2017

(54) SESSION ESTABLISHMENT USING ONE MULTIMEDIA TELEPHONY (MMTEL) APPLICATION SERVER

(75) Inventors: Rogier Noldus, Goirle (NE); Martinus Johannes Franciscus Huijsmans, EE Oisterwijk (NE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 14/367,581

(22) PCT Filed: Dec. 23, 2011

(86) PCT No.: PCT/EP2011/074011
§ 371 (c)(1),
(2), (4) Date: Sep. 15, 2014

(87) PCT Pub. No.: WO2013/091733
PCT Pub. Date: Jun. 27, 2013

(65) Prior Publication Data
US 2015/0016448 A1    Jan. 15, 2015

(51) Int. Cl.
*H04L 29/06* (2006.01)
*H04L 29/08* (2006.01)

(52) U.S. Cl.
CPC ...... *H04L 65/1069* (2013.01); *H04L 65/1016* (2013.01); *H04L 65/1046* (2013.01);
(Continued)

(58) Field of Classification Search
None
See application file for complete search history.

(56) References Cited

U.S. PATENT DOCUMENTS

| 2003/0007497 A1* | 1/2003 | March | H04L 29/06027 370/410 |
| 2005/0058125 A1* | 3/2005 | Mutikainen | H04L 29/12292 370/354 |

(Continued)

OTHER PUBLICATIONS

3GPP, "3GPP TS 23.218 V8.0.0 (Dec. 2007)", 3rd Generation Partnership Project; Technical Specification Group Core Network; IP Multimedia (IM) session handling; IM call model; Stage 2 (Release 8). Dec. 2007. pp. 1-60.

(Continued)

*Primary Examiner* — Benjamin Lamont
(74) *Attorney, Agent, or Firm* — Murphy, Bilak & Homiller, PLLC

(57) ABSTRACT

According to a first aspect of the present invention there is provided a method of handling an IP Multimedia Subsystem, IMS, session establishment request received from a calling party at a Multimedia Telephone Application Server, MMTel AS, within an IMS network from a Serving Call Session Control Function, S-CSCF, over an IMS Service Control, ISC, interface. The method comprises, within the MMTel AS: a) determining that said request is an originating call case request; b) establishing a first Multimedia Telephone, MMTel, service engine instance within the MMTel AS and using that first MMTel service engine instance to handle the request according to an originating call case; c) determining whether or not a called party associated with said request is served by said MMTel AS and, if so, establishing a second MMTel service engine instance within the MMTel AS, passing the request to said second MMTel service engine instance, and using the second MMTel service engine instance to handle the request according to a terminating call case; and d) forwarding said IMS session establishment request over said ISC interface to said S-CSCF, or to another S-CSCF serving the called party.

4 Claims, 5 Drawing Sheets

(52) U.S. Cl.
CPC ...... *H04L 65/1063* (2013.01); *H04L 65/1073* (2013.01); *H04L 65/403* (2013.01); *H04L 67/141* (2013.01)

(56) References Cited

U.S. PATENT DOCUMENTS

| | | | |
|---|---|---|---|
| 2006/0019667 A1* | 1/2006 | Hicks, III | H04M 3/42246 455/445 |
| 2007/0088836 A1* | 4/2007 | Tai | H04M 7/128 709/227 |
| 2009/0086723 A1* | 4/2009 | Henneke | H04M 7/0012 370/352 |
| 2009/0164591 A1* | 6/2009 | Chadli | H04L 65/1006 709/206 |
| 2009/0252153 A1* | 10/2009 | Choi | H04M 3/42017 370/352 |
| 2010/0020790 A1* | 1/2010 | Pallares Lopez | H04L 29/06027 370/352 |
| 2010/0098057 A1* | 4/2010 | Stewart | H04M 3/46 370/352 |
| 2010/0121956 A1* | 5/2010 | Hoffpauir | H04L 65/1043 709/227 |
| 2011/0058520 A1* | 3/2011 | Keller | H04W 76/021 370/328 |
| 2013/0151720 A1* | 6/2013 | Klein | H04L 67/141 709/227 |

OTHER PUBLICATIONS

3GPP, "3GPP TS 23.228 V10.6.0 (Sep. 2011)", 3rd Generation Partnership Project; Technical Specification Group Services and System Aspects; IP Multimedia Subsystem (IMS); Stage 2 (Release 10). Sep. 2011. pp. 1-272.

3GPP, "3GPP TS 23.228 V11.2.0 (Sep. 2011)", 3rd Generation Partnership Project; Technical Specification Group Services and System Aspects; IP Multimedia Subsystem (IMS); Stage 2 (Release 11). Sep. 2011. pp. 1-274.

3GPP, "3GPP TS 24.229 V11.1.0 (Sep. 2011)", 3rd Generation Partnership Project; Technical Specification Group Core Network and Terminals; IP multimedia call control protocol based on Session Initiation Protocol (SIP) and Session Description Protocol (SDP); Stage 3 (Release 11). Sep. 2011. pp. 1-704.

Rosenberg, J. et al., "SIP: Session Initiation Protocol", Network Working Group. RFC 3261. Obsoletes: 2543; Category—Standards Track. The Internet Society. Jun. 2002. pp. 1-244.

Unknown, Author, "Optimisation of Call Routing in Serving to Serving Procedure", France Telecom. 3GPP TSG SA2 IMS key issues; S2-012218; Aug. 27-31, 2001. pp. 1-3. Sophia Antipolis, France.

* cited by examiner

SESSION ESTABLISHMENT USING ONE MULTIMEDIA TELEPHONY (MMTEL) APPLICATION SERVER

TECHNICAL FIELD

The present invention relates to session establishment within an IP Multimedia Subsystem network, and more particularly to apparatus and methods for optimising the establishment process.

BACKGROUND

IP Multimedia (IPMM) services provide a combination of voice, video, messaging, data, etc, within the same session. As the number of basic applications and the media which it is possible to combine increases, the number of services offered to the end users will grow, and the potential for enriching inter-personal communication experience will be improved. This leads to a new generation of personalised, rich multimedia communication services, including so-called "combinational IP Multimedia" services.

IMS is the technology defined by the Third Generation Partnership Project (3GPP) to provide IP Multimedia services over mobile communication networks. IMS provides features to enhance the end-user person-to-person communication experience through the integration and interaction of services. IMS allows enhanced person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP) carried by SIP signalling is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

In an IMS network, Call Session Control Functions (CSCFs) perform processing and routing of signalling. CSCFs handle session establishment, modification and release of IP multimedia sessions using the SIP/SDP protocol suite. 3GPP TS 23.228 describes the logical nodes P-CSCF, I-CSCF, S-CSCF, E-CSCF and BGCF. The S-CSCF conforms to, among others, 3GPP TS 24.229 and performs session control services for User Equipments (UEs). It maintains the session state to support the services, and performs the following functions:
it acts as a registrar according to [RFC3261] at registration;
it notifies subscribers about registration changes;
it provides session control for the registered users' sessions;
it handles SIP requests, and either services these internally or forwards them on to a further node; and
it interacts with IMS Application Servers.

The S-CSCF performs SIP routing according to 3GPP routing procedures.

Within the IMS network, SIP Application Servers (ASs) host and execute services and interface with the S-CSCF via an ISC interface. In the case of a multimedia telephony service, two ASs are worth further consideration here. The Service Centralization and Continuity Application Server (SCC-AS) allows users to access IMS services via various access networks and devices. It also aims to provide for roaming between access networks and for handover of sessions between different types of access networks. The Multi-Media Telephony AS (MMTel AS) facilitates the establishment and control of multimedia sessions including, for example, one or more of voice, video, text, as well as providing a charging point for generating accounting messages (used for online or offline charging).

FIG. 1 illustrates schematically a typical architecture for allowing Multimedia telephony session establishment between two end users, in this example UE-A and UE-B where the former is the calling party and the latter is the called party. [Other network nodes required for this purpose (including the P-CSCF) are omitted for the sake of simplicity.] In FIG. 1, the called party UE-B is shown as possessing two terminal identified as UE-B1 and UE-B2. A stepwise description of the session establishment process with this architecture might be as follows, where it is assumed that the process is triggered by receipt at S-CSCF (A) of an INVITE from UE-A with UE-B as called party:

(1) S-CSCF (A) invokes a first SCC-AS over the ISC reference point.
(2) S-CSCF (A) invokes a first MMTel AS over the ISC reference point.
   The first SCC-AS and first MMTel AS are invoked independently of one another; both services are defined in the Initial Filter Criteria (IFC) associated with UE-A.
   The first MMTel AS may determine that the destination subscriber for this call, UE-B, is a subscriber of the same domain or the MMTel AS may have made some other analysis on the destination for the call, e.g. belonging to a closed user group. Such analysis, to determine whether the called party, i.e. destination of the call, belongs to the same user group, may be used to give a preferential rate for in-company calls. The first MMTel AS does not, however, always have knowledge of (i) whether the destination subscriber is an IMS subscriber, (ii) the identity of the S-CSCF serving that destination subscriber (if indeed an IMS subscriber) and (iii) the MMTel AS node serving that subscriber (again, if indeed an IMS subscriber).
(3) When S-CSCF (A) has received the INVITE back from the first MMTel AS, it applies number normalization if needed.
(4) Number normalization is followed by an ENUM query by S-CSCF (A), if needed. ENUM allows a destination address to be obtained in a form that can be used in the IMS network. More specifically, this might be a SIP URI.
(5) S-CSCF (A) performs a DNS query, in order to obtain information (NAPTR record, SRV record, A record) for forwarding the session establishment request message to the appropriate I-CSCF.
(6) The I-CSCF performs an HSS query over the Cx reference point, in order to obtain the address of the S-CSCF currently serving the destination party, UE-B.
   The HSS may be a "monolithic" HSS or a Data Layered Architecture (DLA) HSS. In the former case, an SLF query by the I-CSCF may be needed, prior to the HSS query. In the latter case, the HSS query is in fact a query towards an HSS front-end.
(7) S-CSCF (B) invokes a second MMTel AS over the ISC reference point.
(8) S-CSCF (B) invokes a second SCC-AS over the ISC reference point.
(9) When S-CSCF (B) has received the INVITE back from the second SCC-AS, it builds a target set and forwards the INVITE to the contact addresses contained in the target set.

It is common for contemporary IP Centrex (a network based telephony application providing PBX-like services) and for MMTel AS to establish a call to multiple terminals of the destination party (in this case UE-B1 and UE-B2) by sending multiple INVITES back to the S-CSCF (B), as opposed to performing "forking" at the S-CSCF (B). Each INVITE that is sent back to S-CSCF (B) is targeted towards one of the destination subscriber's IMPUs. The S-CSCF (B) will then forward the INVITE to the contact address associated with that IMPU. This requires that the IMPUs are provisioned, in the HSS, in separate Implicit Registration Sets (IRS).

FIG. 2 illustrates schematically a modified and optimized deployment scenario according to which MMTel functionality and the SCC-AS are integrated into a single MMTel AS node. A single service invocation over the ISC reference point suffices for invoking SCC-AS and MMTel AS for the call. The MMTel AS takes care that SCC-AS and MMTel are applied in the appropriate sequence, i.e.:

for the originating call case: first SCC-AS, then MMTel; and for the terminating call case: first MMTel, then SCC-AS.

FIG. 3 shows how Value Added Services (VAS) may be applied for the typical MMTel call. Whilst the mechanisms for applying VAS for an MMTel call are currently under discussion, it can be noted that a method that is receiving considerable attention is the use of a 'northbound interface' from the MMTel AS, e.g. Parlay-X. This interface allows the MMTel AS to enhance the MMTel service logic processing with VAS control.

It will be appreciated that, according to the currently implemented and proposed architectures, a number of steps are required in order to extend the SIP session from the MMTel AS serving the calling party to the MMTel AS serving the called party. Whilst this approach is appropriate when the calling and called parties are served by different MMTel AS nodes, it may be inefficient when the called and calling parties are served by the same MMTel AS node at the point in time when the call is being established, i.e. the MMTel service engine serving the calling party and the MMTel service engine serving the called party reside in the same MMTel AS node.

It is reasonable to assume that the MMTel service will be the main form a multimedia communication for mainstream operators, and that IMS, including MMTel, VoLTE, SR-VCC etc. is poised to take off from 2012 onwards. MMTel optimizations are therefore likely to be of great value in the coming years.

SUMMARY

It is an object of the present invention to obviate some of the above mentioned problems and to provide an improved system and method for call establishment within an IMS network.

It is a further an object of the present invention to take advantage of the fact that the calling and called parties associated with an IMS session establishment may be served by the same MMTel AS in order to optimise the session establishment process.

According to a first aspect of the present invention there is provided a method of handling an IP Multimedia Subsystem, IMS, session establishment request received from a calling party at a Multimedia Telephone Application Server, MMTel AS, within an IMS network from a Serving Call Session Control Function, S-CSCF, over an IMS Service Control, ISC, interface. The method comprises, within the MMTel AS:

a) determining that said request is an originating call case request;

b) establishing a first Multimedia Telephone, MMTel, service engine instance within the MMTel AS and using that first MMTel service engine instance to handle the request according to an originating call case;

c) determining whether or not a called party associated with said request is served by said MMTel AS and, if so, establishing a second MMTel service engine instance within the MMTel AS, passing the request to said second MMTel service engine instance, and using the second MMTel service engine instance to handle the request according to a terminating call case; and d) forwarding said IMS session establishment request over said ISC interface to said S-CSCF, or to another S-CSCF serving the called party.

Embodiments of the invention may provide a number of advantages over known session establishment methods and apparatus. These include faster session establishment and a reduced requirement for network infrastructure.

Step c) may only be performed only if no further Initial Filter Criteria, IFC, triggering is required by the S-CSCF in the originating and/or terminating call case handling, i.e. if the request does not need to be returned to the or another S-CSCF prior to performing the MMTel terminating side function.

The method may comprise the further step of determining within said MMTel AS an identity of the S-CSCF serving the called party to allow, at step (d), the request to be forwarded to that S-CSCF, where that S-CSCF may be the same S-CSCF serving the calling party, and, if an identity cannot be determined, returning the request to the S-CSCF serving the calling party for onward routing.

The method may comprise including within the request, prior to forwarding over the ISC interface, either a SIP header indicating that no further service invocation should be made for the session establishment or a term_access parameter within the Route header.

According to a second aspect of the present invention there is provided a Multimedia Telephone Application Server, MMTel AS, for use in an IP Multimedia Subsystem, IMS, network. The apparatus comprises an IMS Service Control, ISC, interface arranged to exchange SIP messages including IMS session establishment requests with a Serving Call Session Control Function, S-CSCF, and Multimedia Telephony, MMTel, service engine logic arranged to establish a first MMTel service engine instance upon receipt of an IMS session establishment request at said ISC interface, where the request is an originating call case request, and to use the first MMTel service engine instance to handle the request according to the originating call case. The MMTel AS further comprises a determining entity arranged to determine whether or not a called party associated with the received IMS session establishment request is served by said MMTel AS and, if so, for causing said MMTel service engine logic to establish a second MMTel service engine instance, for passing said request to that second MMTel service engine instance, and for using that second MMTel service engine instance to handle the request according to a terminating call case, and a request forwarding entity arranged to forward an IMS session establishment request handled by said first and second MMTel service engine instances to said S-CSCF, or to another S-CSCF serving the called party, over said ISC interface.

According to a third aspect of the present invention there is provided method of handling IP Multimedia Subsystem, IMS, session establishment within an IMS network. The method comprises receiving at a Serving Call Session Control Function, S-CSCF, from a calling party, an IMS session establishment request, and forwarding the request to a Multimedia Telephone Application Server, MMTel AS. At the MMTel AS, it is determined that said request is an originating call case request, and a first Multimedia Telephone, MMTel, service engine instance is established within the MMTel AS. That instance is used to handle the request according to an originating call case.

It is then determined whether or not a called party associated with said request is served by said MMTel AS and, if so, a second MMTel service engine instance is established within the MMTel AS. The request is passed to said second MMTel service engine instance, and the second MMTel service engine instance is used to handle the request according to a terminating call case. The IMS session establishment request is forwarded over said ISC interface to said S-CSCF, or to another S-CSCF serving the called party, and the request further handled in order to establish an IMS session between said calling and said called party.

According to a third aspect of the present invention there is provided an IP Multimedia Subsystem, IMS, network, comprising a Serving Call Session Control Function, S-CSCF, for receiving from a calling party, an IMS session establishment request and for forwarding the request to a Multimedia Telephone Application Server, MMTel AS. The network further comprises an MMTel AS comprising:
- an IMS Service Control, ISC, interface arranged to exchange SIP messages including IMS session establishment requests with said Serving Call Session Control Function, S-CSCF;
- Multimedia Telephony, MMTel, service engine logic arranged to establish a first MMTel service engine instance upon receipt of an IMS session establishment request at said ISC interface, where the request is an originating call case request, and to use the first MMTel service engine instance to handle the request according to the originating call case;
- a determining entity arranged to determine whether or not a called party associated with the received IMS session establishment request is served by said MMTel AS and, if so, for causing said MMTel service engine logic to establish a second MMTel service engine instance, for passing said request to that second MMTel service engine instance, and for using that second MMTel service engine instance to handle the request according to a terminating call case; and
- a request forwarding entity arranged to forward an IMS session establishment request handled by said first and second MMTel service engine instances to said S-CSCF, or to another S-CSCF serving the called party, over said ISC interface.

BRIEF DESCRIPTION OF THE DRAWINGS

FIG. 6 is a flow diagram illustrating an improved procedure for handling an IMS session request at an MMTel AS.

DETAILED DESCRIPTION

As discussed above, the IP Multimedia Subsystem (IMS) facilitates the invocation of multiple SIP-AS's during session establishment ('IFC chaining'). In most cases however only a single SIP-AS is invoked by the S-CSCF for multimedia calls, namely the MMTel AS, with the likelihood that Value Added Services (VAS) will be facilitated by a "northbound" interface from the MMTel AS as opposed to invoking VAS separately over the ISC reference point. Moreover, many operators apply charging from the MMTel application server (or from IP Centrex application), minimising the role of the S-CSCF in generating charging records for SIP sessions. Taking these factors into account, together with the fact that, when a multimedia session is established, (a) the calling and called party often reside (are registered in) the same S-CSCF (the number of S-CSCFs in a network is normally small, e.g. two S-CSCFs), and (b) the calling and called party often reside in (are served by) the same MMTel AS, an approach to optimising the session set up procedure presents itself. This in turn may give rise to substantial savings in IMS core network equipment requirements for Multimedia telephony (MMTel).

It is proposed here to take advantage of the fact that, for a subscriber A (calling party) and a subscriber B (called party) that are being served by the same MMTel AS, a multimedia session establishment may be handled internally in one and the same MMTel AS node. More specifically, internal routing is applied from the MMTel service engine serving the calling party to the MMTel service engine serving the called party.

This method may be applied for VoLTE deployments, including SR-VCC, ICS, CSFB and device transfer (session continuity). Applying VAS in combination with the MMTel call is still facilitated, as VAS may be applied through the northbound interface from the MMTel AS (assuming that is implemented).

Figure 1:
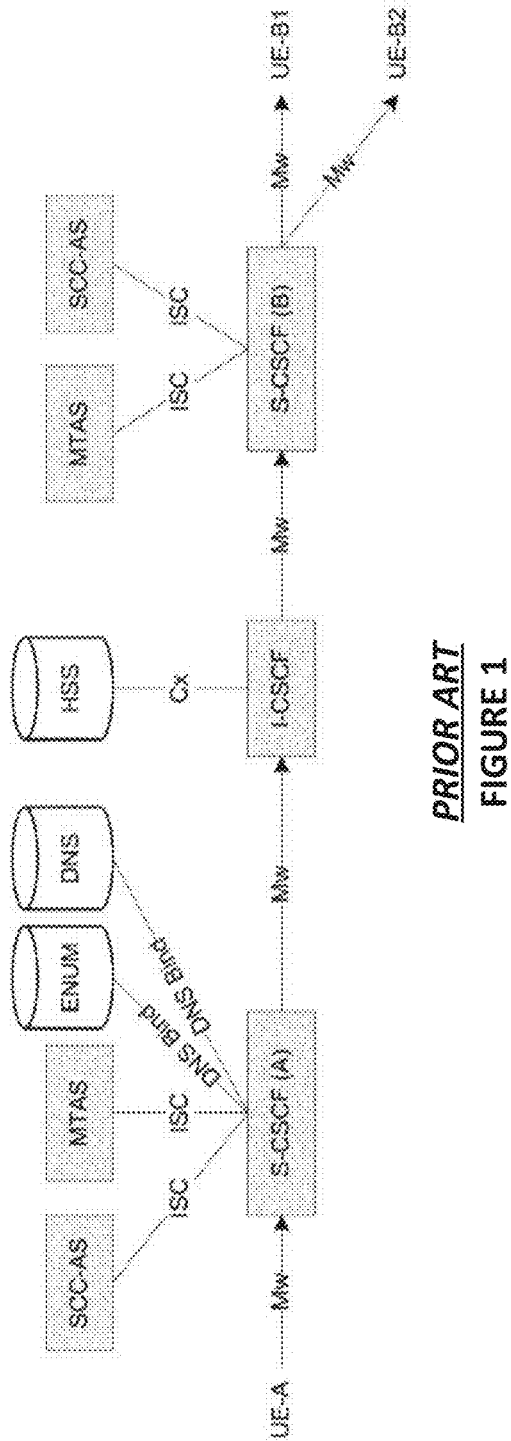
FIG. 1 illustrates schematically components within a prior art IMS architecture involved in establishing an IMS telephony session.
Figure 2:
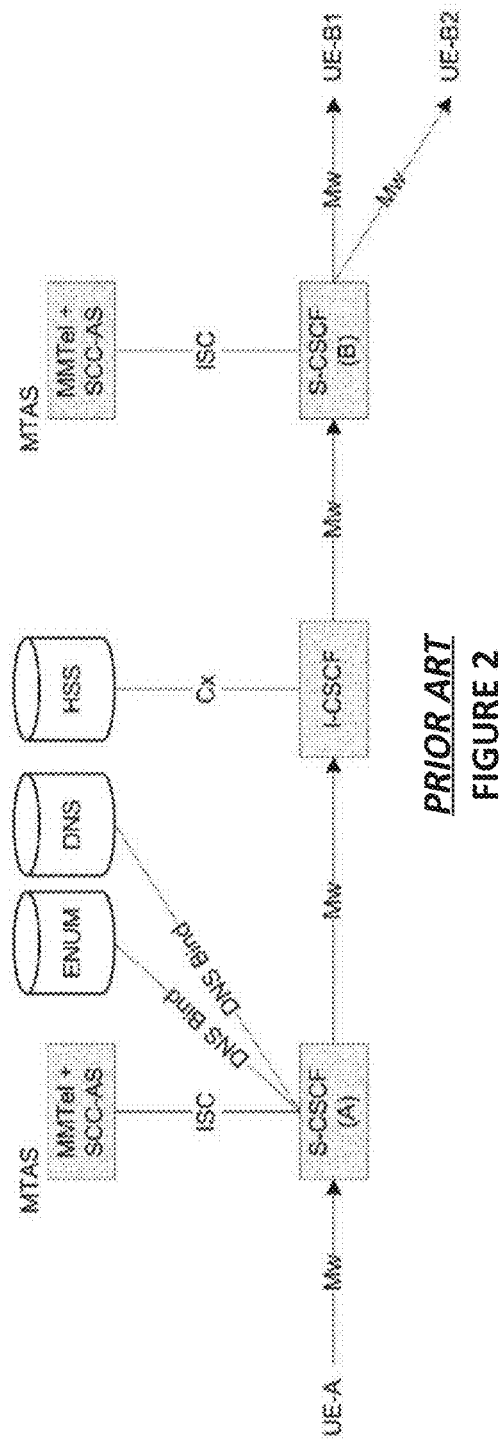
FIG. 2 illustrates schematically components within an optimised prior art IMS architecture involved in establishing an IMS telephony session.
Figure 3:
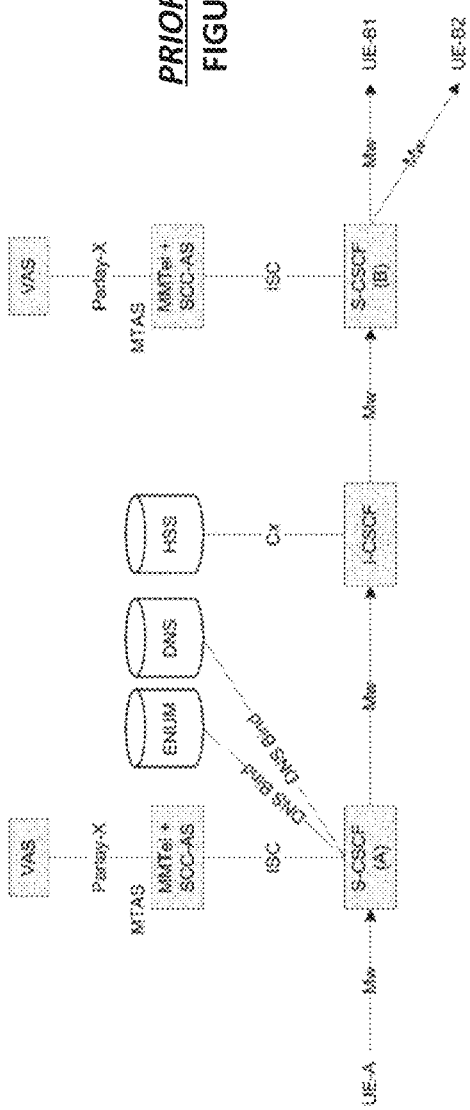
FIG. 3 illustrates schematically the optimised prior art IMS architecture of FIG. 2 with added northbound interfaces to Value Added Services infrastructure.
Figure 4:
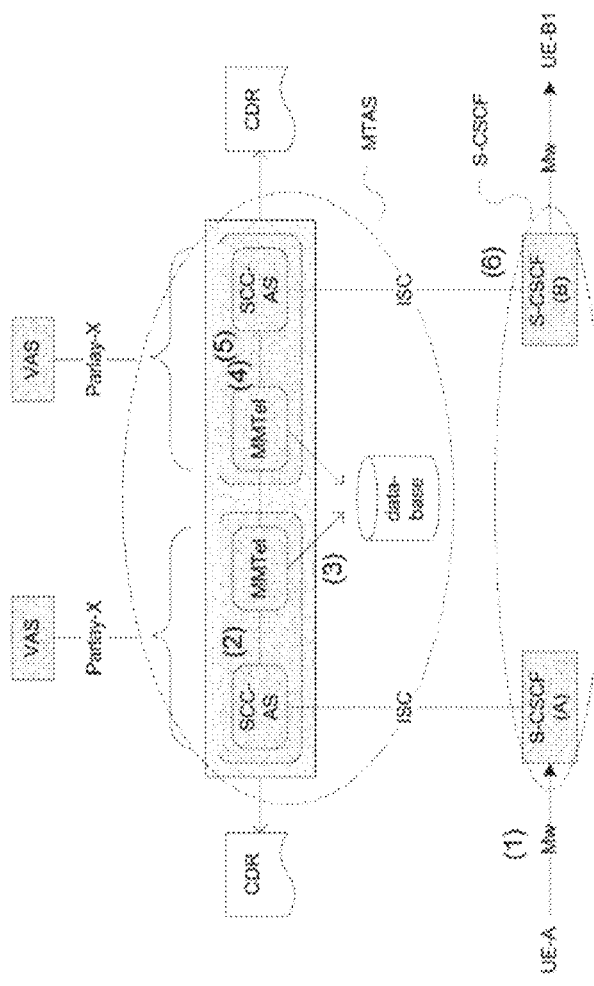
FIG. 4 illustrates schematically components within an improved, optimised IMS architecture in which calling and called parties are served by the same MMTel AS but by different S-CSCFs, and the MMTel AS has knowledge of the S-CSCF serving the called party.

FIG. 4 illustrates schematically a scenario in which, at multimedia session establishment, a calling party UE-A and a called party UE-B are registered in the same MMTel AS. [In this figure, and the following referenced figures, the term MTAS is used to denote the MMTel AS.] The key steps in the establishment process are as follows:

(1) A Multimedia session establishment procedure is initiated by UE-A, e.g. by UE-A sending an INVITE identifying UE-B as called party. The INVITE is routed to the S-CSCF and to the MMTel AS serving UE-A.

(2) SCC-AS functionality is applied by the MMTel AS, and MMTel service engine logic is executed. The MMTel service engine may use a northbound interface towards VAS.

(3) When the MMTel service engine logic has concluded its service logic execution for this stage of the call establishment, it checks in a served subscriber database to determine whether or not the destination subscriber, UE-B, is a subscriber that is currently served by this same MMTel AS.

(4) If the result of this check is affirmative, then the MMTel AS "spawns" a second MMTel service engine instance and forwards the Multimedia session establishment message to that second MMTel service engine instance. The second MMTel service engine instance will be the MMTel service engine instance serving UE-B.

(5) The second MMTel service engine applies normal behaviour in terms of Multimedia session establishment. The INVITE is then passed on to a next SCC-AS instance within the MMTel AS.

(6) The INVITE is sent to the S-CSCF which establishes the Multimedia session towards the destination subscriber's terminal(s).

It will be appreciated that the approach illustrated in FIG. 4 replaces a number of the inter-node signalling exchanges with a single, MMTel AS-internal message forwarding process, potentially leading to substantial equipment saving in an IMS network. It will also be appreciated that when the calling and called parties are currently not registered in the same MMTel AS instance for MMTel services, then the SIP session establishment can revert to existing methodology, i.e. the call is routed from the MMTel AS of the calling party, back to that party's S-CSCF, and from there towards the S-CSCF serving the called party (or can be broken out to another network, if applicable). MMTel AS nodes implementing the new functionality can be slotted into existing IMS networks alongside legacy MMTel AS nodes.

The optimised approach to MMTel session establishment introduced above is likely to achieve the best results when it is deployed in combination with a mechanism that directs users, between whom there is a reasonable likelihood that sessions will be established, to register with the same MMTel AS. Such a mechanism will employ a network-wide 'registration view' and should monitor and maintain static and dynamic interaction patterns (MMTel session establishment) between users. In other words, the mechanism will try to register a user with an MMTel AS that will achieve the best result (from a network resource point of view) when the optimised approach is employed.

It should be noted here that the optimised approach to establishing an IMS session between two parties is facilitated by existing 3GPP IMS specifications relating to usage of the ISC reference point. Specifically:

3GPP TS 23.228 v10.6.0, (FIG. 4.3a) specifies that a SIP-AS that is invoked from the S-CSCF over the ISC reference point, may act as a terminating user agent (UA). Thus, the S-CSCF does not require the SIP-AS to return the SIP INVITE to it, hence allowing the passing of the INVITE between the calling and called party MMTel service engine instances within the MMTel AS.

3GPP TS 23.228 v10.6.0, (FIG. 4.3b) specifies that a SIP-AS may send a SIP INVITE to an S-CSCF over the ISC reference point by acting as an originating UA. Hence, an S-CSCF is able to receive a SIP INVITE without previously having sent a corresponding INVITE to the SIP-AS.

In order to avoid the optimised IMS session establishment mechanism interfering with existing processes, it is important that the mechanism be employed only when there is no further IFC triggering applicable at the S-CSCF for the SIP session in respect of the calling party. Possible approaches to ensuring that this is the case include the following:

Explicit indication in service invocation from S-CSCF to MMTel AS. The S-CSCF of the calling party has that user's IFC available, so has knowledge as to whether the invocation of the MMTel AS constitutes the last service invocation. The S-CSCF may include an explicit indication in the service invocation (sent to the MMTel AS), to inform MMTel AS accordingly. This explicit indication may be a parameter in the topmost Route header, for example:

Route: mmtel@sip-as1.ims-network.operator.se; session=originating;last_spt, (where SPT is a Service Point Trigger which is a trigger definition in the IFC).

Registration based. When registration occurs for a subscriber, the S-CSCF applies third party registration towards the MMTel AS. The third party registration REGISTER message may include a designated parameter or header informing the MMTel AS that, when it (the MMTel AS) is invoked for an originating call by this subscriber, there will not be any further service invocation.

Subscription based. During third party registration, the MMTel AS obtains a subscriber service profile from the HSS. The subscriber service profile may contain a designated parameter indicating that, for originating calls, the MMTel will be the last application invoked from the S-CSCF for this subscriber. Using this approach, there is no need for the S-CSCF to derive the requirement from the IFC. The subscriber service profile, sent from the HSS to the S-CSCF, contains a designated parameter indicating that the subscriber is an MMTel subscriber and that internal linking of MMTel service engines is allowed, provided that the SIP session is an MMTel SIP session.

When the MMTel AS has completed the MMTel service processing for the calling party, and has determined that the called party is served by the same MMTel AS node, it must still verify that it is entitled to forward the multimedia session internally to an MMTel service engine instance for that called party. Put differently, it must ensure that no other service invocations are required for multimedia sessions towards the called party prior to MMTel service invocation. Possible approaches to achieve this include the registration and subscription based approaches described above in relation to the calling party. Of these, the Subscription based may be the preferred option as it has no impact on the S-CSCF (IFC evaluation and service triggering) and does not require SIP message enhancement.

As has already been discussed, when the MMTel AS has completed the MMTel service processing for the calling party, it checks its database to determine whether the called party is served by the same MMTel AS instance. The MMTel AS is aware of a served subscriber's Implicit Public User Identity (IMPU) by means of third party registration or Subscribe-Notify, or a combination of the two. The IMPUs contained in the MMTel AS database correspond to the IMPUs provisioned in the HSS, for example:

sip:john.smith@enterprise.com
sip:+46703601700@enterprise.com sip:+46703601700@ims.telia.se
tel:+46703601700

The Request-URI (R-URI) of the called party (included in the SIP INVITE that is being handled) may correspond to one of the destination subscriber's IMPUs recorded in the MMTel AS' database, in which case a match can be found directly. If the R-URI contains a phone number, then the phone number may be in national format, e.g. tel: 0703601700 or sip:0703601700@ims.telia.se;user=phone (phone-context does not have to be present; user=phone may be absent). In this case, the database check shall be performed with a phone number that is normalized to an international format. Hence, the database check shall be done on, for example, tel:+46703601700.

Wildcard IMPUs are not considered in detail here. As such, when the R-URI is a distinct IMPU from a wildcard IMPU range, then matching logic in the MMTel AS may not find a match. The call will be handed back to the S-CSCF and normal SIP session establishment applies. However, as an optional enhancement, the wildcard IMPU matching logic that is currently present in the HSS may be replicated (1:1; i.e. identical) in the MMTel AS. In that case, the proposed method applies also for wildcard IMPUs. An example of a wildcard IMPU is tel:+3116124. Phone numbers starting with these digits fall within that wildcard IMPU, i.e. belong to that phone number range. For example, tel:+31161241122 is a phone number belonging to that number range, i.e. belonging to that wildcard IMPU. It is referred to as a 'distinct IMPU' of the corresponding wildcard IMPU.

In addition to handling the MMTel service invocations for both the calling and called parties within the same MMTel AS, it may be desirable to allow the MMTel AS to send the INVITE to the S-CSCF serving the called party (rather than returning it to the S-CSCF serving the calling party). This is the case illustrated in FIG. 4. The address of the S-CSCF serving the called party may be known in the MMTel AS as part of the user service data, resulting from third party registration. Upon receipt of the INVITE from the MMTel AS, the S-CSCF serving the called party can build a target set for the call towards the called party. The Route header within the INVITE sent by the MMTel AS may contain an indication that the call is a terminating call, i.e. Route: s-cscf1.ims-network.operator.se;term. The INVITE must, in addition, contain an indication that there shall not be a service invocation for this terminating INVITE, which is based on known methodology, for example: Route: s-cscf1.ims-network.operator.se;term_access. [In this example, "term_access" is used as Route header parameter.] The S-CSCF determines from this parameter that this is not just a terminating call, but a terminating access call, i.e. a call for which it shall build a target set.

As an alternative to the use of the term_access, it is also possible to use a dedicated SIP header for the purpose of indicating to the S-CSCF (serving the called party) that no service invocation should be made for the call. However, as this alternative approach requires checking of the dedicated header by the IFC, it may be less efficient.

The INVITE message relating to the originating SIP session contains a P-served-user header identifying the calling party, i.e. P-served-user header will be equal to one of the IMPUs of the calling party. When the MMTel service logic instance in the MMTel AS forwards the INVITE message towards an MMTel service logic instance in the same MMTel AS, the P-served-user header shall be set to the R-URI, so that it identifies the called party (as the served user). A P-served-user header, identifying the calling party, would normally be removed by the S-CSCF serving the calling party, when forwarding the INVITE request towards the called party's S-CSCF. The called party's S-CSCF will, in turn, include a P-served-user header in the INVITE request, identifying the called party. When the MMTel AS applies internal forwarding of the INVITE request, the P-served-user header needs to be adapted internally within the MMTel AS.

When the INVITE is internally forwarded in the MMTel AS, also the term-ioi parameter in the P-charging-vector would need to be set. The term-ioi parameter is in this case probably the same as the orig-ioi parameter, as the originating and the terminating call are served by the same operator. The reasoning for adapting the P-charging-vector is similar to the reasoning for adapting the P-served-user header, as described above.

Figure 5:
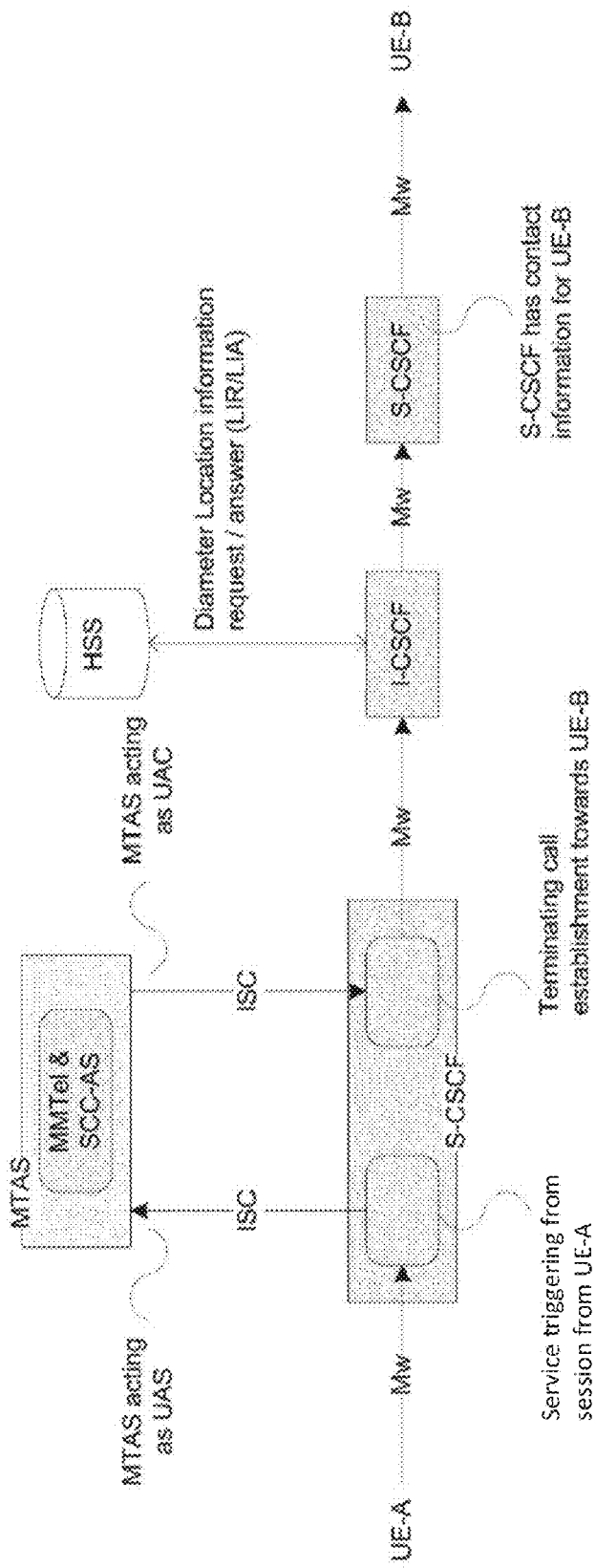
FIG. 5 illustrates schematically components within an improved, optimised IMS architecture in which calling and called parties are served by the same MMTel AS but by different S-CSCFs, and the MMTel AS has no knowledge of the S-CSCF serving the called party.

In some cases the MMTel AS may not have knowledge of the S-CSCF currently serving the called party. In these cases, the MMTel AS may send the INVITE, destined for the called party, back to the S-CSCF that had triggered the MMTel AS in the first place, i.e. the S-CSCF serving the calling party. This case is illustrated in FIG. 5, where, when the S-CSCF receives the INVITE from the MMTel AS with Route header indicating term_access, it checks whether it has a service record for the identified destination subscriber. In the negative case, the S-CSCF forwards the INVITE to an I-CSCF. The I-CSCF applies Diameter LIR/LIA towards the HSS, as normal for a terminating call. The HSS provides the address of the S-CSCF currently assigned to the called party. The I-CSCF then forwards the INVITE to that S-CSCF (serving the called party) and includes the term_access parameter in the Route header. [This copying of the term_access parameter by the I-CSCF, from the Route header in the incoming INVITE to the Route header in the outgoing INVITE, may be compared to the copying of the orig parameter by the I-CSCF, when handling an originating call.] The presence of the term_access parameter in the Route header has the effect that the S-CSCF of the called party will not apply IFC evaluation for the terminating call. Instead, it will immediately build a target set and offer the call to the called party.

The S-CSCF serving the calling party, when receiving the INVITE request from MMTel AS with term_access parameter in the Route header, would not have to apply Record-routing for the extending of the INVITE destined for the called party, to the S-CSCF serving that called party. Not applying Record-routing by the S-CSCF at this point implies that the process of the S-CSCF that is used for forwarding this INVITE request towards the S-CSCF serving the destination party, will not remain in the communication session.

When call diversion applies for the SIP session towards the called party, the MMTel service logic process instance controlling the call towards the called party may act as is done today. It may establish a diverted SIP session on behalf of the called party and establish that SIP session through the same S-CSCF as that through which the SIP session towards the called party is established. Alternatively, the MMTel service logic process instance controlling the call towards the called party may internally start service logic processing relating to a diverted call, and then send the INVITE to the S-CSCF.

Implementation of the embodiments described above may result in a number of significant advantages. These include a saving in terms of IMS core network equipment, faster call establishment, and improved resilience against network failures (due to the reduced number of nodes and logical entities that the session establishment process must traverse)

Figure 6:
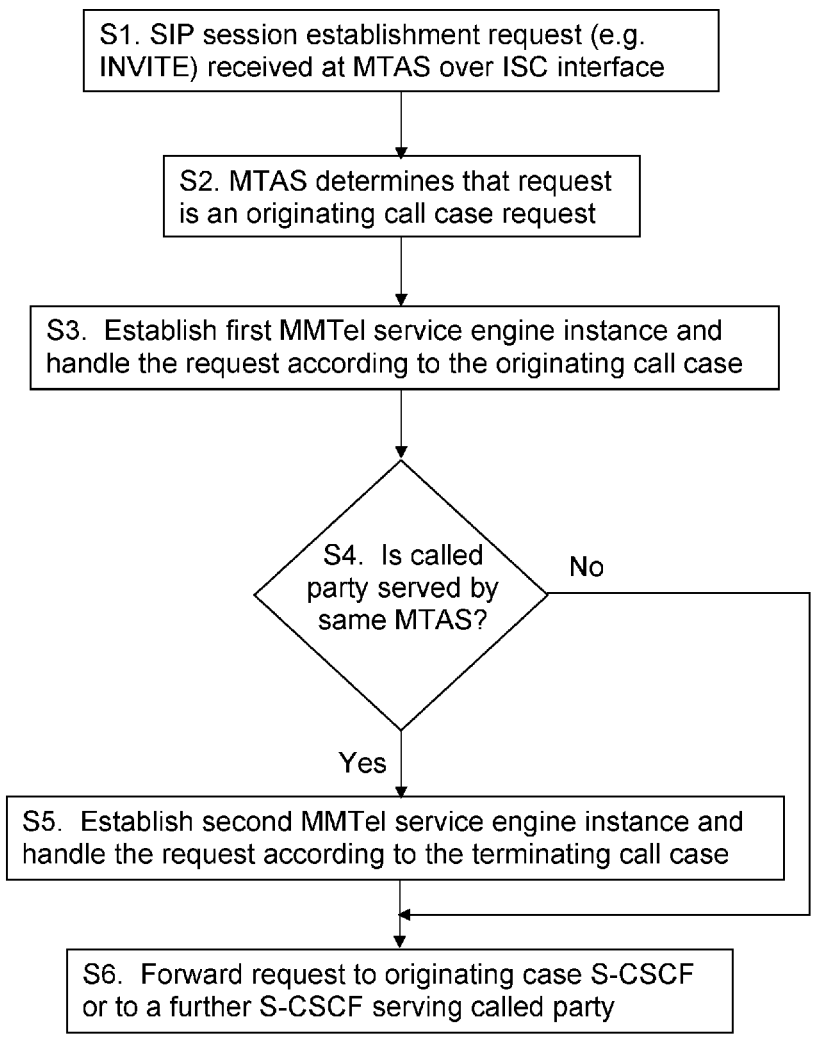

FIG. 6 is a flow diagram illustrating a top level procedure for handling a SIP session establishment Request (INVITE) at a MMTel AS incorporating the new functionality described above. At step S1, the Request is received at the MMTel AS from the S-CSCF serving the calling party, over the ISC interface. At step S2, the MMTel AS inspects the message and determines that the Request is associated with an originating call case and must be handled as such. At step S3 the MMTel AS establishes a first MMTel service engine instance and passes the Request to that instance for handling according to the originating call case. Once this task is completed, at step S4, the MMTel AS inspects a local database to determine whether or not the called party (R-URI) is served by the same MMTel AS. If not, then the MMTel AS deals with the Request according to currently implemented handling rules, including forwarding the request to the S-CSCF from which it was originally received (step S6). If however the answer is yes (at step S4), the MMTel AS establishes at step S5 a second MMTel service engine instance and passes the Request to that instance for handling according to the terminating call case. Once this process is completed, at step S6 the Request is 1) returned to the S-CSCF from which the Request was originally received if a) the MMTel AS has no knowledge of the S-CSCF serving the called party or b) that S-CSCF is the same S-CSCF serving the called party, or 2) is forwarded to another S-CSCF that is serving the called party if that S-CSCF is known to the MMTel AS.

Figure 7:
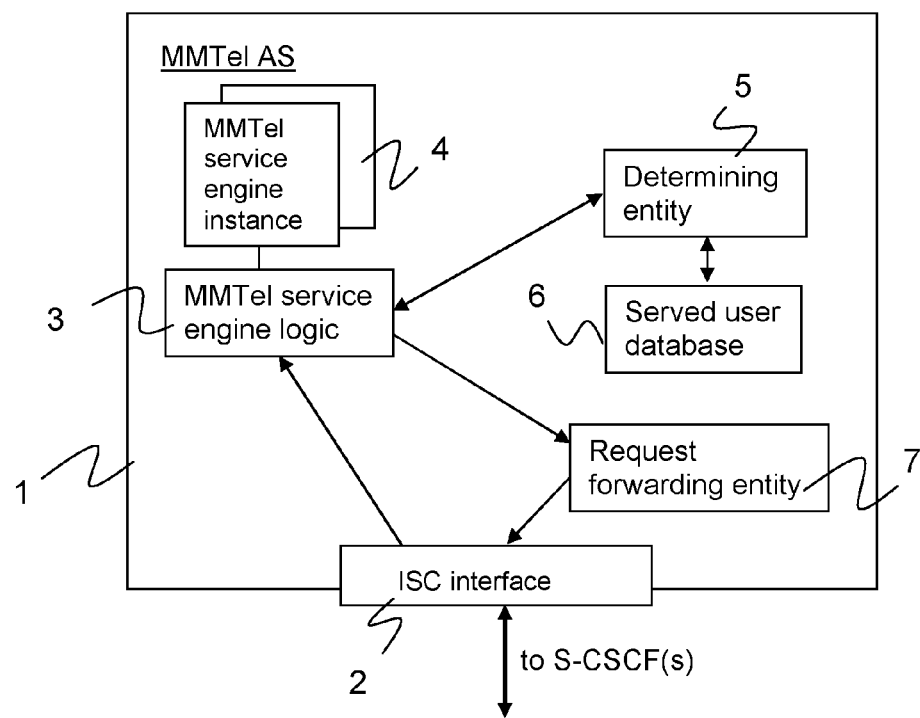
FIG. 7 illustrates schematically an improved Multimedia Telephony Application Server configured to implement the procedure of FIG. 6.

Referring now to FIG. 7, this figure illustrates schematically an MMTel AS 1 including functionality for efficiently handling IMS session establishment. In particular, the MMTel AS includes an ISC interface 2 that allows the MMTel AS to exchange SIP messages with one or more S-CSCFs. The MMTel AS further comprises MMTel service engine logic 3 that is responsible for establishing MMTel service engine instances 4 (on behalf of the called and calling parties associated with session establishment) and for passing a Request between instances. The MMTel service engine logic 3 communicates with a Determining entity 5 which is responsible for determining whether or not a called party is served by the MMTel AS itself. To do this, the entity 5 inspects a served user database 6. Once a Request has been handled by the called and calling party MMTel service engine instances, it is passed to a Request forwarding entity 7 that is responsible for forwarding the Request, via the ISC interface 2, to either the same S-CSCF (that serves the calling party) or to a different S-CSCF (when the called party is served by a different S-CSCF and the MMTel AS has knowledge of that S-CSCF's address).

It will be appreciated by the person skilled in the art that various modifications may be made to the above described embodiments without departing from the scope of the present invention.

The invention claimed is:

1. A method at a Multimedia Telephony Application Server, MMTel AS, configured for operation in an IP Multimedia Subsystem, IMS, network, said method comprising:
receiving an IMS session establishment request originating from a calling party, said IMS session establishment request received at the MMTel AS over an IMS Service Control, ISC, interface, from a Serving Call Session Control Function, S-CSCF, associated with the calling party;
determining that the IMS session establishment request is an originating call case;
establishing a first Multimedia Telephony, MMTel, service engine instance within the MMTel AS and using the first MMTel service engine instance to handle the request according to the originating call case;
determining that a called party associated with the IMS session establishment request is served by the MMTel AS and in response:
  establishing a second MMTel service engine instance within the MMTel AS;
  passing the IMS session establishment request within the MMTel AS to the second MMTel service engine instance, and
  using the second MMTel service engine instance to handle the request according to a terminating call case; and
forwarding the IMS call session establishment request over the ISC interface to the S-CSCF associated with the called party, if known, and otherwise to the S-CSCF associated with the calling party;
wherein the step of determining that the called party is served by the MMTel AS is performed responsive to determining that no further Initial Filter Criteria, IFC, triggering is required with respect to the calling or called party, such that the corresponding sub-steps of establishing, passing to and using the second MMTel service engine instance are performed responsive to determining that no further IFC triggering is required;
wherein the MMTel AS receives in respect of the calling and or called party an indication as to whether further Initial Filter Criteria triggering is required or not; and
wherein said indication is provided:
  at third-party registration of the calling and or called party at the MMTel AS, from the S-CSCF or S-CSCFs serving the called and calling parties, or from a Home Subscriber Server; or
  within the request received from the S-CSCF serving the calling party.

2. A method at a Multimedia Telephony Application Server, MMTel AS, configured for operation in an IP Multimedia Subsystem, IMS, network, said method comprising:
receiving an IMS session establishment request originating from a calling party, said IMS session establishment request received at the MMTel AS over an IMS Service Control, ISC, interface, from a Serving Call Session Control Function, S-CSCF, associated with the calling party;
determining that the IMS session establishment request is an originating call case;
establishing a first Multimedia Telephony, MMTel, service engine instance within the MMTel AS and using the first MMTel service engine instance to handle the request according to the originating call case;
determining that a called party associated with the IMS session establishment request is served by the MMTel AS and in response:
  establishing a second MMTel service engine instance within the MMTel AS;
  passing the IMS session establishment request within the MMTel AS to the second MMTel service engine instance, and
  using the second MMTel service engine instance to handle the request according to a terminating call case; and
  forwarding the IMS call session establishment request over the ISC interface to the S-CSCF associated with the called party, if known, and otherwise to the S-CSCF associated with the calling party; and
wherein the method further comprises, in response to receiving an IMS session establishment request in an originating call case, but where the called party is not associated with the MMTel AS, not establishing and using a second MMTel service engine instance, and instead handling the IMS session establishment request in a first MMTel service engine instance, according to the original call case, and forwarding the IMS session establishment request to the S-CSCF associated with the called party.

3. A method at a Multimedia Telephony Application Server, MMTel AS, configured for operation in an IP Multimedia Subsystem, IMS, network, said method comprising:

receiving an IMS session establishment request originating from a calling party, said IMS session establishment request received at the MMTel AS over an IMS Service Control, ISC, interface, from a Serving Call Session Control Function, S-CSCF, associated with the calling party;

determining that the IMS session establishment request is an originating call case;

establishing a first Multimedia Telephony, MMTel, service engine instance within the MMTel AS and using the first MMTel service engine instance to handle the request according to the originating call case;

determining that a called party associated with the IMS session establishment request is served by the MMTel AS and in response:

establishing a second MMTel service engine instance within the MMTel AS;

passing the IMS session establishment request within the MMTel AS to the second MMTel service engine instance, and using the second MMTel service engine instance to handle the request according to a terminating call case; and forwarding the IMS call session establishment request over the ISC interface to the S-CSCF associated with the called party, if known, and otherwise to the S-CSCF associated with the calling party;

wherein forwarding the IMS session establishment request over the ISC interface comprises attempting to determine within the MMTel AS an identity of the S-CSCF associated with the called party and, if the identity of the S-CSCF associated with the called party cannot be determined, returning the request to the S-CSCF associated with the calling party, for onward routing.

4. A method at a Multimedia Telephony Application Server, MMTel AS, configured for operation in an IP Multimedia Subsystem, IMS, network, said method comprising:

receiving an IMS session establishment request originating from a calling party, said IMS session establishment request received at the MMTel AS over an IMS Service Control, ISC, interface, from a Serving Call Session Control Function, S-CSCF, associated with the calling party;

determining that the IMS session establishment request is an originating call case;

establishing a first Multimedia Telephony, MMTel, service engine instance within the MMTel AS and using the first MMTel service engine instance to handle the request according to the originating call case;

determining that a called party associated with the IMS session establishment request is served by the MMTel AS and in response:

establishing a second MMTel service engine instance within the MMTel AS;

passing the IMS session establishment request within the MMTel AS to the second MMTel service engine instance, and using the second MMTel service engine instance to handle the request according to a terminating call case; and forwarding the IMS call session establishment request over the ISC interface to the S-CSCF associated with the called party, if known, and otherwise to the S-CSCF associated with the calling party;

wherein the method further comprises including within the IMS session establishment request, prior to forwarding over the ISC interface, either a SIP header indicating that no further service invocation should be made for the session establishment or a term_access parameter within an included Route header.

* * * * *